(12) United States Patent
Hara et al.

(10) Patent No.: US 11,276,202 B2
(45) Date of Patent: Mar. 15, 2022

(54) MOVING IMAGE GENERATION APPARATUS, MOVING IMAGE GENERATION METHOD, AND NON-TRANSITORY RECORDING MEDIUM

(71) Applicants: Takayuki Hara, Kanagawa (JP); Yohei Fujita, Kanagawa (JP); Osamu Ogawara, Kanagawa (JP)

(72) Inventors: Takayuki Hara, Kanagawa (JP); Yohei Fujita, Kanagawa (JP); Osamu Ogawara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 81 days.

(21) Appl. No.: 16/845,440

(22) Filed: Apr. 10, 2020

(65) Prior Publication Data

US 2020/0334862 A1     Oct. 22, 2020

(30) Foreign Application Priority Data

Apr. 19, 2019 (JP) .............................. JP2019-079992

(51) Int. Cl.
| | |
|---|---|
| G06T 15/00 | (2011.01) |
| G06T 7/00 | (2017.01) |
| G06T 7/73 | (2017.01) |
| G06T 7/80 | (2017.01) |

(52) U.S. Cl.
CPC .................. *G06T 7/97* (2017.01); *G06T 7/74* (2017.01); *G06T 7/80* (2017.01)

(58) Field of Classification Search
None
See application file for complete search history.

(56) References Cited

U.S. PATENT DOCUMENTS

| | | | | |
|---|---|---|---|---|
| 7,275,986 | B2 * | 10/2007 | Mori ....................... | A63F 13/10 463/8 |
| 8,854,457 | B2 * | 10/2014 | De Vleeschouwer ...................... | G11B 27/105 348/135 |
| 9,555,803 | B2 * | 1/2017 | Pawlicki ................. | G01S 11/12 |
| 9,996,981 | B1 * | 6/2018 | Tran ....................... | G06K 9/4671 |
| 10,282,914 | B1 * | 5/2019 | Tran ....................... | G01G 19/44 |
| 10,573,060 | B1 * | 2/2020 | Ascolese ................. | A63F 13/52 |

(Continued)

FOREIGN PATENT DOCUMENTS

| | | |
|---|---|---|
| JP | 2004-236863 | 8/2004 |
| JP | 2005-056101 | 3/2005 |
| JP | 2006-172037 | 6/2006 |

OTHER PUBLICATIONS

Chang Ha Lee, et al., "Mesh Saliency" ACM transactions on graphics (TOG), vol. 24. No. 3. 2005.

(Continued)

*Primary Examiner* — Soo Shin
(74) *Attorney, Agent, or Firm* — IPUSA, PLLC

(57) ABSTRACT

A moving image generation apparatus includes: circuitry to: capture images of a three-dimensional model using different values of a camera parameter of a virtual camera to generate captured images; calculate goodness-of-fit indices using the captured images as inputs, the goodness-of-fit indices each indicating a suitability of a corresponding captured image among the captured images; and generate camerawork that traces values of the camera parameter of the virtual camera, based on the calculated goodness-of-fit indices.

10 Claims, 13 Drawing Sheets

(56) References Cited

U.S. PATENT DOCUMENTS

| | | | |
|---|---|---|---|
| 10,911,645 B2* | 2/2021 | Ikeda | G06T 19/00 |
| 2004/0104935 A1* | 6/2004 | Williamson | G06T 15/20 |
| | | | 715/757 |
| 2005/0264851 A1 | 12/2005 | Hara | |
| 2009/0282369 A1* | 11/2009 | Jones | G06F 16/26 |
| | | | 715/848 |
| 2011/0119555 A1 | 5/2011 | Hara | |
| 2011/0274350 A1 | 11/2011 | Hara | |
| 2012/0206565 A1* | 8/2012 | Villmer | H04N 5/2251 |
| | | | 348/36 |
| 2012/0229829 A1 | 9/2012 | Hara | |
| 2012/0306933 A1* | 12/2012 | Osako | A63F 13/5252 |
| | | | 345/672 |
| 2013/0162671 A1 | 6/2013 | Fujita et al. | |
| 2014/0347526 A1 | 11/2014 | Hara et al. | |
| 2015/0043827 A1 | 2/2015 | Hara | |
| 2015/0254819 A1 | 9/2015 | Hara | |
| 2016/0140714 A1 | 5/2016 | Hara | |
| 2016/0262608 A1* | 9/2016 | Krueger | G06T 19/006 |
| 2016/0321779 A1 | 11/2016 | Fujita | |
| 2018/0039856 A1 | 2/2018 | Hara | |
| 2018/0260646 A1 | 9/2018 | Hara | |
| 2019/0132521 A1* | 5/2019 | Fujita | H04N 5/23238 |
| 2019/0289282 A1* | 9/2019 | Briggs | G06K 9/00791 |
| 2020/0174107 A1* | 6/2020 | Briggs | G06T 7/50 |
| 2020/0214559 A1* | 7/2020 | Krueger | A42B 3/046 |
| 2020/0334862 A1* | 10/2020 | Hara | G06T 7/74 |
| 2021/0089040 A1* | 3/2021 | Ebrahimi Afrouzi | |
| | | | A47L 9/2894 |

OTHER PUBLICATIONS

Taco S. Cohen, et al., "Spherical CNNs" In proceedings of International Conference on Machine Learning, 2018, p. 1-p. 15.

* cited by examiner

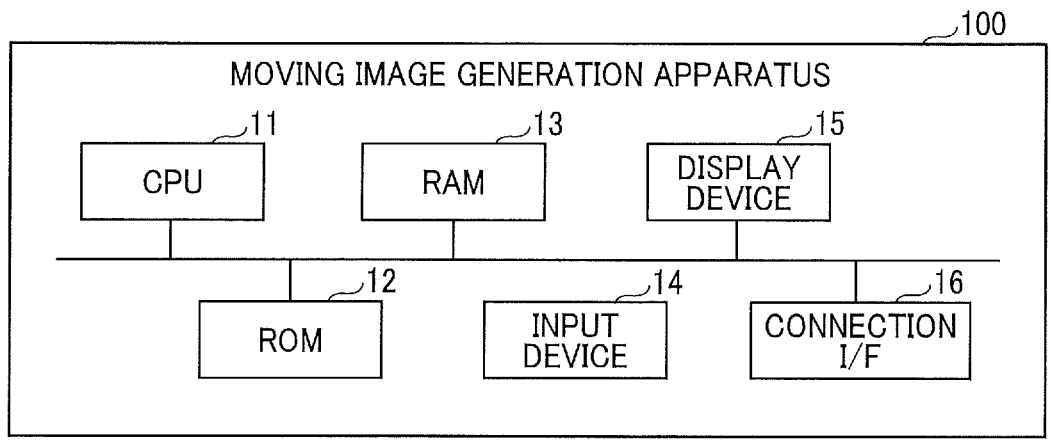
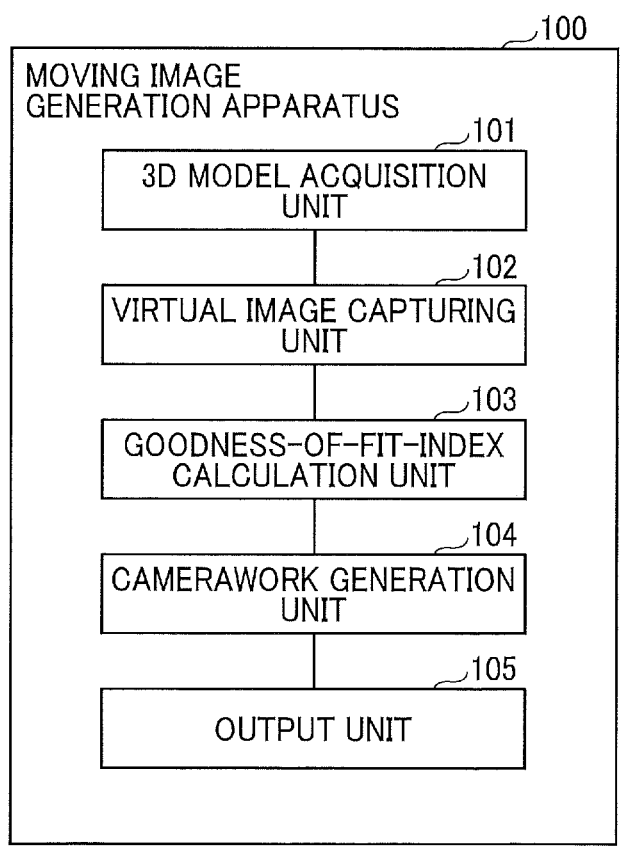

FIG. 3
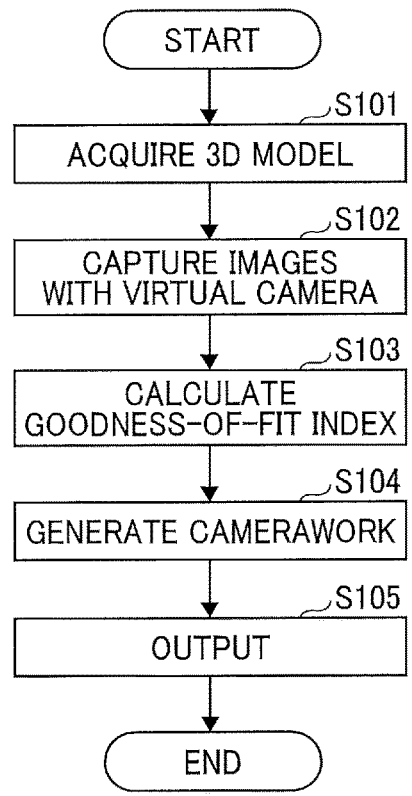
FIG. 4A
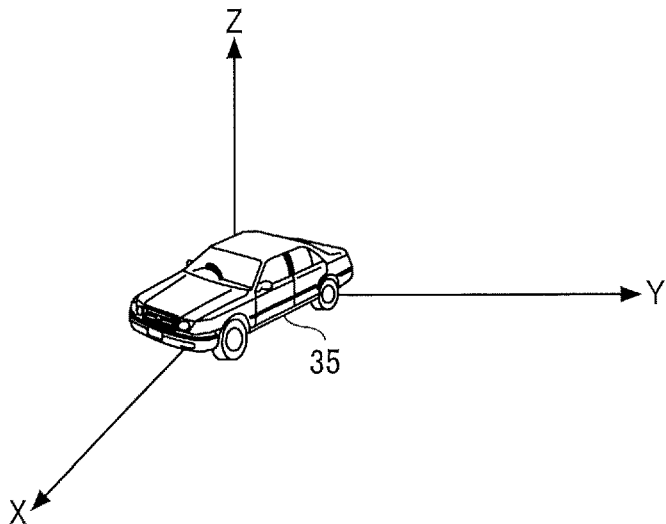
FIG. 4B
< VERTEX DEFINITION >
v1 : (12, 23, 34)
v2 : (25, 45, 11)
v3 : (71, 87, 90)
...
N : (66, 35, 97)
< MESH DEFINITION >
v1-v2-v3
v2-v3-v8
v5-v6-v9
...

MOVING IMAGE GENERATION APPARATUS, MOVING IMAGE GENERATION METHOD, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application No. 2019-079992, filed on Apr. 19, 2019, in the Japan Patent Office, the entire disclosure of which is hereby incorporated by reference herein.

BACKGROUND

Technical Field

The present disclosure relates to a moving image generation apparatus, a moving image generation method, and a non-transitory recording medium.

Description of the Related Art

Representing a three-dimensional (3D) object on a computer is referred to as 3D computer graphics (hereinafter, referred to as 3D CG). In addition, an object represented in 3D CG or 3D CG data is referred to as a 3D model. To display a 3D model on a display device such as a display, an image processing apparatus arranges the 3D model in a virtual space, virtually illuminates the 3D model, and generates a captured image of the 3D model with a virtual camera.

Accordingly, to display a 3D model, camera parameters (such as a position, an orientation, and a focal length) of the virtual camera have to be determined. Changing the values of the camera parameters in time series enables the 3D model viewed from various viewpoints to be displayed just like a moving image. The time-series camera parameter values for a 3D model are referred to as camerawork.

There have hitherto been known techniques for generating camerawork for a 3D model. For example, there is a technique for generating camerawork for a baseball video game. This technique is for generating camerawork in accordance with predetermined rules in a limited environment of baseball. In addition, there is a technique for changing values of camera parameters relating to a camera and a light source when music data is reproduced to render a 3D model. This technique is for generating camerawork in accordance with, for example, the artist name, the genre, or the tempo of the music data. There is also a technique for assigning the priority to each object in a virtual space and providing a user with camerawork defined by camerawork information of a target object. In this technique, an operation on a gaze point and a not-to-be-changed region are designated in advance to generate the camerawork.

None of these camerawork generation techniques, however, are techniques for generating camerawork in accordance with the content of a 3D model. The content of a 3D model refers to which type the 3D model is. Generating camerawork in accordance with the content of a 3D model refers to generating some camera parameter values representing an appropriate way of displaying the 3D model.

On the other hand, a technique for detecting a highly noticeable region (salient region) in a 3D model is disclosed. That is, a highly noticeable region is detected, and a camera is moved to capture images of the region. In this manner, camerawork according to the content of a 3D model can be generated (see, for example, C. H. Lee, A. Varshney, D. W. Jacobs, "Mesh saliency", ACM transactions on graphics (TOG), Vol. 24. No. 3. 2005).

However, the aforementioned literature just contains description about detecting a salient region of a 3D model but contains no description about determining the values of camera parameters such as an image-capturing viewpoint and a focal length that are suitable for capturing images of the salient region.

SUMMARY

Example embodiments of the present invention include a moving image generation apparatus includes: circuitry to: capture images of a three-dimensional model using different values of a camera parameter of a virtual camera to generate captured images; calculate goodness-of-fit indices using the captured images as inputs, the goodness-of-fit indices each indicating a suitability of a corresponding captured image among the captured images; and generate camerawork that traces values of the camera parameter of the virtual camera, based on the calculated goodness-of-fit indices.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 1 is an example of a hardware configuration diagram of a moving image generation apparatus;

FIG. 2 is an example of a functional block diagram illustrating functions of the moving image generation apparatus as blocks;

FIG. 3 is an example of a flowchart illustrating a procedure in which the moving image generation apparatus generates camerawork;

FIGS. 4A and 4B are diagrams illustrating an example of a 3D model;

Figure 5:
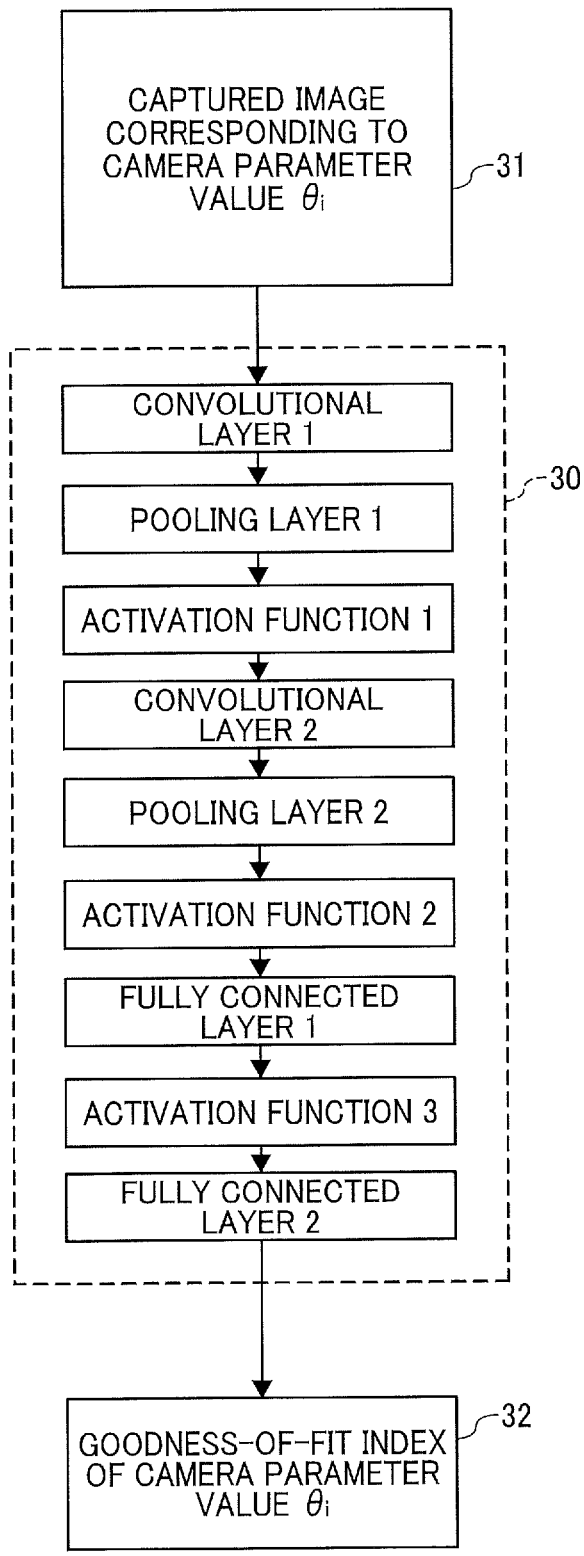
FIG. 5 is a diagram illustrating an example of a configuration employed in a case where a neural network is used in a regression model.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

A moving image generation apparatus and a moving image generation method carried out by the moving image generation apparatus will be described below as an example of embodiments of the present disclosure.

Terms used in the present embodiments will be described first.

The term "3D model" refers to data of three-dimensional computer graphics (3D CG) that represents a three-dimensional (3D) object on a computer or refers to an object represented by 3D CG.

The term "camera parameters" refers to information that determines the viewpoint of a 3D model subjected to image capturing and specifically to, for example, a position, an orientation, a focal length, an aspect ratio, and a lens distortion of a virtual camera. In embodiments described below, a camera projection center, a gaze position, and an optical-axis rotation are used in relation to the position and orientation of the camera.

The term "camerawork" refers to values of camera parameters arranged in time series.

The term "content of a 3D model" refers to a type of the 3D model. For example, there is a 3D model having a feature locally at a front, rear, or side portion or a 3D model having a feature in terms of the entire shape viewed in the distance. Further, the viewing direction in which a 3D model exhibits the feature differs from one 3D model to another. As described above, the term "content of a 3D model" refers to a feature of the 3D model relating to an appropriate way of displaying the 3D model.

The term "camerawork having a viewpoint and a focal length that are suitable for content of a 3D model" refers to camerawork that enables a viewer to easily understand the content of the 3D model. For example, a viewpoint that characterizes a 3D model is included in such camerawork. Preferably, the term "camerawork having a viewpoint and a focal length that are suitable for content of a 3D model" refers to camerawork having an aesthetic property in composition (arrangement of the 3D model in image data).

The term "virtual camera" does not refer to a camera that is present in reality but refers to a camera that is virtually present and generates a capture image according to defined camera parameter values.

The term "goodness-of-fit index" refers to an index that reflects the aesthetic property of a corresponding image, the recognizability of a target object, or the like, and that is subjectively set by a person. The goodness-of-fit index preferably indicates a higher value as the person feels the image more suitable.

A moving image generation apparatus according to a first embodiment is trained with captured images and goodness-of-fit indices indicating suitability degrees of the respective captured images in advance. As a result of this training, the moving image generation apparatus calculates goodness-of-fit indices of respective captured images of a 3D model that are obtained with a virtual camera. The term "suitable captured image" refers to a captured image that enables a viewer to easily understand content of a corresponding 3D model or a captured image having an aesthetic property as described above. The moving image generation apparatus generates camerawork so as to obtain a captured image having a high goodness-of-fit index. Techniques of the related art do not take into consideration a way in which a 3D model is viewed when an image of the 3D model is captured with a virtual camera. This makes it difficult to generate camerawork including camera parameter values suitable for the content of the 3D model.

In the present embodiment, a plurality of images of a 3D model are captured while changing the viewpoint and the focal length of the virtual camera, and camerawork is generated on the basis of goodness-of-fit indices calculated for the respective captured images. In this manner, camerawork having a viewpoint and a focal length that are suitable for the content of the 3D model is successfully generated.

FIG. 1 is an example of a hardware configuration diagram of a moving image generation apparatus 100 according to the present embodiment. As illustrated in FIG. 1, the moving image generation apparatus 100 includes a central processing unit (CPU) 11, a read-only memory (ROM) 12, a random access memory (RAM) 13, an input device 14, a display device 15, and a connection interface (I/F) 16.

The CPU 11 centrally controls operation of the moving image generation apparatus 100. The CPU 11 executes various control programs stored in the ROM 12 by using a predetermined area of the RAM 13 as a workspace to implement various functions of the moving image generation apparatus 100. Specific details of the functions of the moving image generation apparatus 100 will be described later.

The ROM 12 is a nonvolatile memory (non-rewritable memory) that stores programs and various kinds of setting information relating to the moving image generation apparatus 100. The RAM 13 is, for example, a storage device such as a synchronous dynamic random access memory (SDRAM). The RAM 13 functions as a workspace of the CPU 11 and temporarily stores programs and various kinds of data.

The input device 14 is a peripheral device used for accepting an input (an operation on a keyboard or a mouse, a voice-based operation, or the like) from a user. The display device 15 is a component or external peripheral device that displays various kinds of information relating to the moving image generation apparatus 100. The display device 15 is, for example, a liquid crystal display. Note that a touch panel to which the display device 15 and the input device 14 are integrated together may be used. The connection I/F 16 is an interface that connects the moving image generation apparatus 100 to an external device. For example, the connection I/F 16 may be a general-purpose interface such as a Universal Serial Bus (USB) interface or a communication interface that enables wired or wireless communication with an external device.

The functions of the moving image generation apparatus 100 according to the present embodiment will be described next with reference to FIG. 2. FIG. 2 is an example of a functional block diagram illustrating the functions of the moving image generation apparatus 100 as blocks. The moving image generation apparatus 100 includes a 3D model acquisition unit 101, a virtual image capturing unit 102, a goodness-of-fit-index calculation unit 103, a camerawork generation unit 104, and an output unit 105. These functional units of the moving image generation apparatus 100 are functions or units that are implemented by the CPU 11 executing a program that is loaded into the RAM 13 from the ROM 12 illustrated in FIG. 1. Note that this program may be distributed from a server used for distribution of programs or may be distributed after being stored on a computer-readable recording medium such as a USB flash memory or an optical recording medium.

Since the functions of the moving image generation apparatus 100 correspond to respective steps of a flowchart illustrated in FIG. 3, the functions of the moving image generation apparatus 100 will be described with reference to the flowchart.

FIG. 3 is an example of a flowchart illustrating a procedure in which the moving image generation apparatus 100 generates camerawork in the present embodiment. Description will be given below in accordance with the flowchart of FIG. 3.

In step S101, the 3D model acquisition unit 101 acquires a 3D model to be processed, from an internal or external storage device. The storage device may be, for example, the ROM 12 or the RAM 13, or may be a device on a network.

An example of a 3D model 35 is illustrated in FIGS. 4A and 4B. The 3D model 35 illustrated in FIG. 4A represents an automobile arranged in a 3D coordinate system. The 3D model 35 are divided into polygons to be converted into pieces of data. In other words, the 3D model 35 is formed by a combination of polygons having various sizes and various shapes. As illustrated in FIG. 4B, the 3D model 35 has 3D coordinates (vertex definition) of vertices of the polygons and designations (mesh definition) of sets of vertices coupled to form respective faces (meshes).

Note that the data format of the 3D model 35 is not limited to the format illustrated in FIG. 4B, and a commonly used data format of 3D CG is also usable. For example, the polygons may be quadrangles or the like in some cases instead of triangles. In addition, the 3D model 35 may be represented by a collection of points in the 3D coordinate system as well as polygons.

In step S102, the virtual image capturing unit 102 generates captured images of the 3D model 35 that are obtained with a virtual camera. That is, the virtual image capturing unit 102 captures images of the 3D model 35 to obtain a plurality of captured images. The virtual camera is controlled on the basis of camera parameters such as a position, an orientation, a focal length, an aspect ratio, and a lens distortion. The virtual image capturing unit 102 changes values of the camera parameters to generate the plurality of captured images. Each of the position, the orientation, the focal length, the aspect ratio, and the lens distortion is slightly changed (to create a uniform distribution or a Gaussian distribution). All the slightly different values of the position, the orientation, the focal length, the aspect ratio, and the lens distortion are combined to generate the camera parameter values used in image capturing.

In step S103, the goodness-of-fit-index calculation unit 103 accepts each of the captured images generated in step S102 as an input and calculates a goodness-of-fit index of the captured image (this processing corresponding to processing of obtaining a goodness-of-fit index corresponding to a camera parameter value).

A regression model that has been trained in advance is usable in calculation of the goodness-of-fit index. A technique that is commonly used in a regression analysis, such as a linear regression, a logistic regression, a support vector regression, or a neural network, is usable in the regression model.

FIG. 5 illustrates an example of a configuration employed in a case where a neural network is used in the regression model. A neural network 30 illustrated in FIG. 5 is a neural network called a convolutional neural network (CNN). A captured image 31 corresponding to a camera parameter value $\theta_i$ is input to the neural network 30, and the neural network 30 outputs a goodness-of-fit index 32 of the camera parameter value $\theta_i$. Here, i denotes identification information of the camera parameter. The goodness-of-fit index is calculated for each camera parameter value (each captured image).

The neural network 30 includes first and second convolutional layers, first and second pooling layers, first to third activation functions, and first and second fully connected layers. The first and second convolutional layers each refer to processing of calculating the sum of products of individual sets of corresponding elements in grid-like numerical data called kernel (or filter) and in numerical data of a partial image (called window) having a size identical to that of the kernel to convert the numerical data into a single value. This conversion processing is performed while slightly shifting the window. In this manner, the pieces of numerical data are converted into grid-like numerical data (that is, tensor) having a smaller size. The first and second pooling layers each refer to processing of creating a single numerical value from the numerical data of a window. For example, there are maximum value pooling for selecting the maximum value in a window and average value pooling for selecting an average value in a window. Features of a captured image are extracted by the first and second convolutional layers, and exactness of a position of a target object is reduced by the first and second pooling layers. The first to third activation functions are functions (for example, ReLU, Tan h, or a sigmoid function) for converting (activating) an input into a non-linear output. The first fully connected layer corresponds to an input layer that collects outputs of the second activation function. The second fully connected layer corresponds to an output layer. The numerical values collected by the first fully connected layer are transferred to the second fully connected layer through the third activation function. The second fully connected layer has a single output node, and this output node outputs the goodness-of-fit index.

Note that the number of first and second convolutional layers, the number of first and second pooling layers, the number of first to third activation functions, and the number of first and second fully connected layers in FIG. 5 are merely an example, and the processing order is also merely an example.

A user prepares many sets of a captured image and a corresponding goodness-of-fit index in advance. Explanatory variables are adjusted on the basis of this data. This processing is referred to as training. Examples of the explanatory variables include the content of the filter and coefficients between nodes of the first and second fully connected layers.

In the case of a regression model, an activation function of the output layer (the second fully connected layer) may be identity mapping (which does not perform conversion). In addition, a square error is commonly used as an error function. Accordingly, there is known a method of back-propagating a square of a difference between a goodness-of-fit index output from the second fully connected layer and a corresponding prepared goodness-of-fit index from the second fully connected layer to the first convolutional layer at the time of training to correct the content of the filter and the coefficients between the nodes of the first and second fully connected layers. A goodness-of-fit index is an index that reflects the aesthetic property of an image, the recognizability of a target object, or the like, and that is subjectively set by a person. Training is performed so that a higher goodness-of-fit index is calculated as the person feels an image more suitable.

For example, captured images obtained by capturing images of various objects from various viewpoints are displayed to a plurality of subjects in advance to prompt the subjects to assess whether each of the images is suitable for representing the corresponding object in five levels (which is an example). This five assessment levels are used as the goodness-of-fit indices, and sets of a captured image and a goodness-of-fit index thereof are obtained as pieces of training data. The regression model is trained with these pieces of training data. A captured image is given as an input to the regression model thus trained, and the goodness-of-fit index is obtained as an output value.

In step S104, the camerawork generation unit 104 generates camerawork (time-series camera parameter values) on the basis of the goodness-of-fit indices calculated by the camerawork generation unit 104 for the respective camera parameter values.

Figure 6:
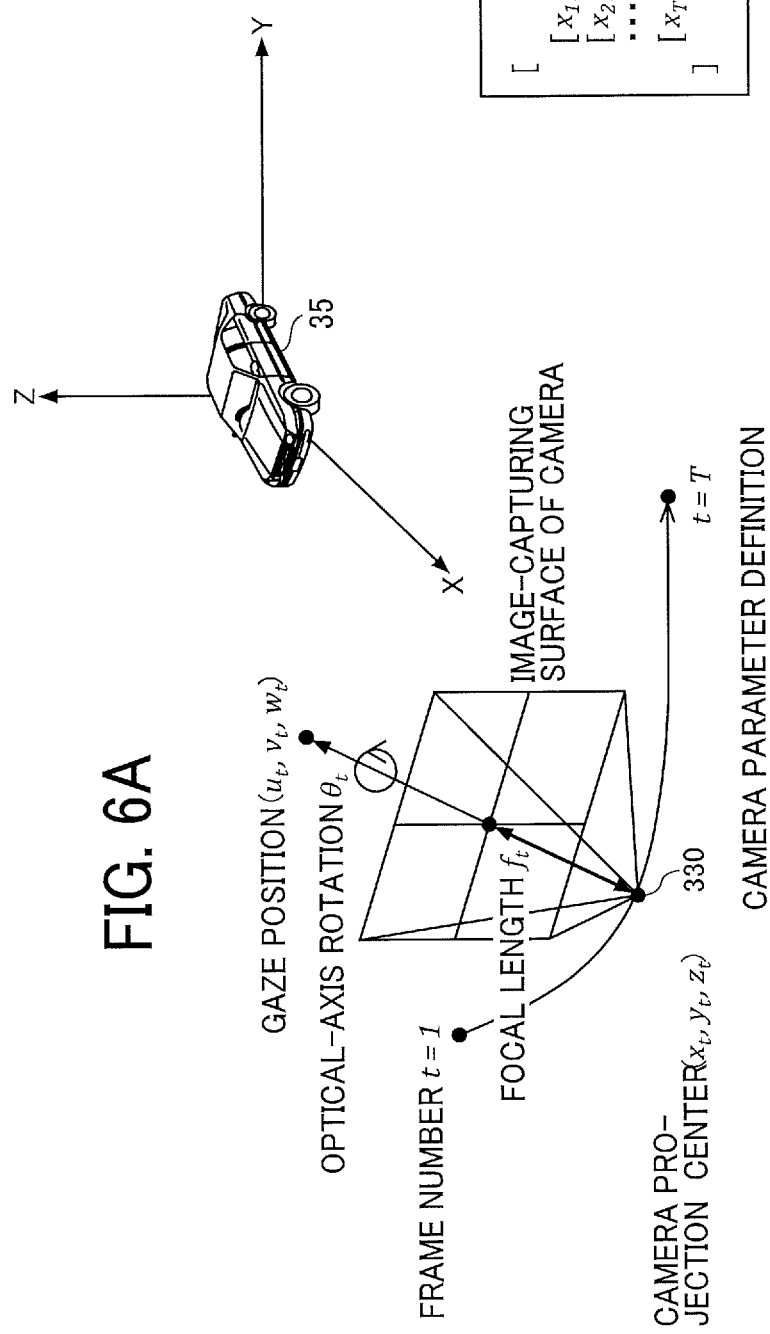
FIGS. 6A to 6C are diagrams describing camera parameters and camerawork.

FIGS. 6A to 6C are diagrams describing camera parameters and camerawork. FIG. 6A illustrates a state in which a virtual camera 330 moves in a period from time (frame number) t=1 to time t=T. FIG. 6B illustrates the coordinate system. As illustrated in FIG. 6A, the camera parameters are, for example, a camera projection center $(x_t, y_t, z_t)$, a gaze position $(u_t, v_t, w_t)$, an optical-axis rotation $\theta_t$, and a focal length $f_t$.

Since the time t ranges from t=1 to t=T, camerawork includes sets of the camera parameter values arranged in time series as illustrated in FIG. 6C.

The camerawork generation unit 104 sets a path along which the virtual camera 330 passes through the plurality of sets of camera parameter values in a camera parameter space. The camerawork generation unit 104 selects a path having a largest cumulative value of the goodness-of-fit indices on the path to successfully generate camerawork according to the content of the 3D model 35. That is, the camerawork generation unit 104 solves an optimization problem in which the camera parameters of the camerawork are used as variables and the goodness-of-fit indices of the camerawork (the sum of goodness-of-fit indices for the respective sets of camera parameter values included in the camerawork) is an object function. A common optimization algorithm is usable as the solving method of this optimization problem. For example, a grid search, a random search, a hill climbing method, a downhill simplex method, a branch and bound method, a simulated annealing method, or a genetic algorithm is usable.

Figure 7:
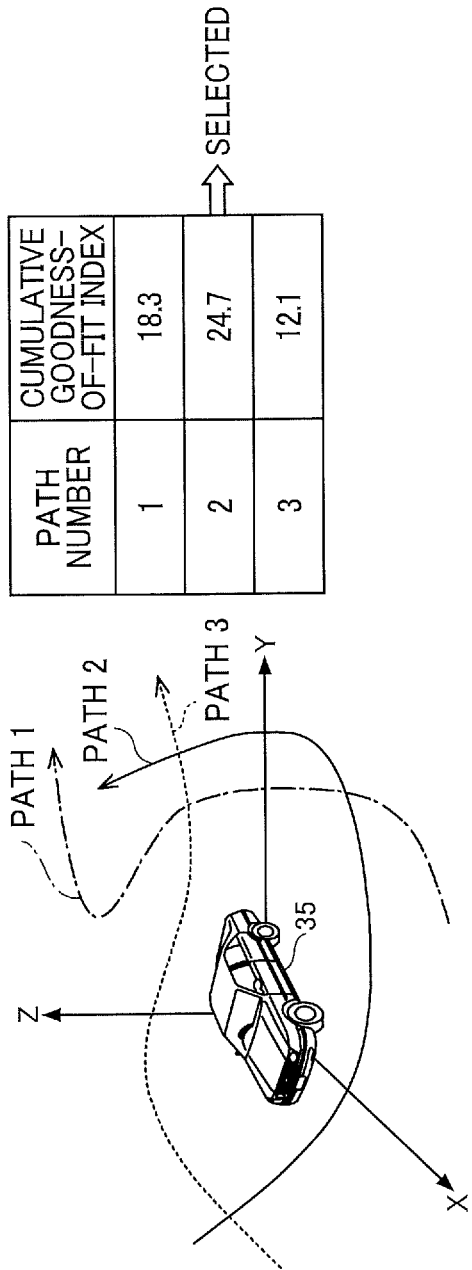
FIGS. 7A and 7B are diagrams schematically describing generation of camerawork.

FIGS. 7A and 7B are diagrams schematically describing generation of camerawork. For convenience of explanation, FIG. 7A illustrates three paths 1 to 3 that pass different image capturing positions in the case where the image-capturing position (x, y, z) is used as the camera parameter (the gaze point is fixed to the origin). The camerawork generation unit 104 calculates, for each of the paths 1 to 3, the sum of the goodness-of-fit indices of captured images obtained at the respective image-capturing positions included in the path, and determines, as camerawork, the path having the largest sum of the goodness-of-fit indices.

In an example illustrated in FIG. 7B, three pieces of camerawork (path numbers 1 to 3) are randomly generated. The cumulative goodness-of-fit indices are calculated for the respective paths. Camerawork (path number 2) having the largest value is selected. For convenience of visualization, the image-capturing position (3D vector) is handled as the camera parameter in FIG. 7A. The path may be considered in an eight-dimensional camera parameter space also including the gaze position, the optical-axis rotation, and the focal length of the virtual camera as illustrated in FIG. 6C, or a lens distortion may also be added to the camera parameters.

Note that it is assumed that a predetermined pattern is determined in terms of transition speed of the camerawork along the path such that the speed is maintained constant or the speed is increased at the start point and is decreased at the end point. The procedure of the camerawork generation process will be described with reference to FIG. 8.

In step S105, the output unit 105 outputs the camerawork generated in step S104. The process then ends.

Figure 8:
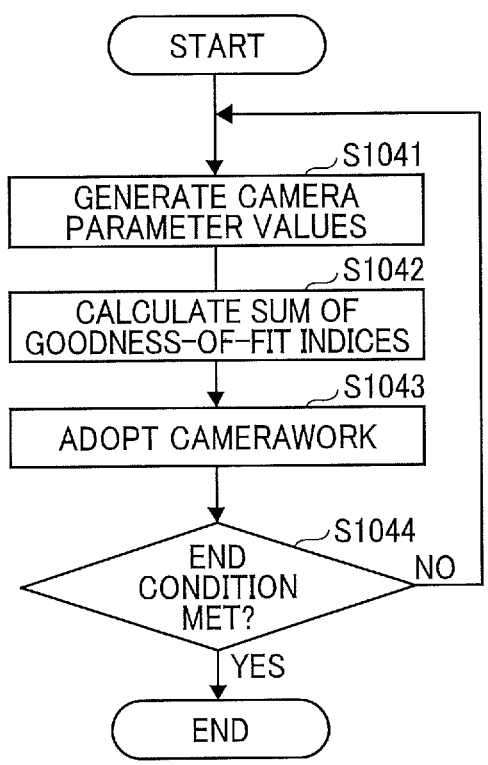
FIG. 8 is an example of a flowchart illustrating a procedure in which a camerawork generation unit generates camerawork.

FIG. 8 is an example of a flowchart illustrating the procedure in which the camerawork generation unit 104 generates camerawork.

First, the camerawork generation unit 104 uses a uniform distribution or a Gaussian distribution to randomly generate camera parameter values included in camerawork (S1041). That is, random camera parameter values and random camerawork including these camera parameter values are generated.

The camerawork generation unit 104 determines the sum of the goodness-of-fit indices for the respective camera parameter values included in the camerawork (S1042).

If the determined sum of the goodness-of-fit indices is greater than all the values obtained through preceding iterations, the camerawork generation unit 104 adopts the current camerawork (S1043).

The series of processing steps described above is iterated until an end condition, for example, iterating the processing steps a predetermined number of times, is met (S1044). In this manner, the camera parameter values of camerawork are successfully determined through the random search.

In a manner described above, camerawork including values of camera parameters (such as the gaze position and the focal length) suitable for the content of the 3D model 35 is successfully generated. The moving image generation apparatus 100 according to the present embodiment is capable of automatically generating camerawork that enables a feature of the 3D model 35 or the 3D model 35 having a high aesthetic property to be displayed in accordance with the content of the 3D model 35 and of generating a moving image displaying the 3D model 35.

The moving image generation apparatus 100 reads the 3D model 35 and the camerawork and captures images of the 3D model 35 in accordance with the camerawork. In this manner, the computer successfully generates a moving image that displays the 3D model 35 in a way suitable for the 3D model 35. The moving image may be distributed from a network such as a cloud to a terminal device, or may be read from a storage device and be reproduced.

<Modifications (Variations)>

Variations of each of the processing steps according to the present embodiment will be described below.

In step S103 described above, the goodness-of-fit index is calculated one by one for each of the captured images generated in step S102. Alternatively, all the captured images may be collectively input to the regression model at a time and the goodness-of-fit indices of the respective camera parameter values corresponding to the respective captured images may be calculated. This processing will be described with reference to FIG. 9.

Figure 9:
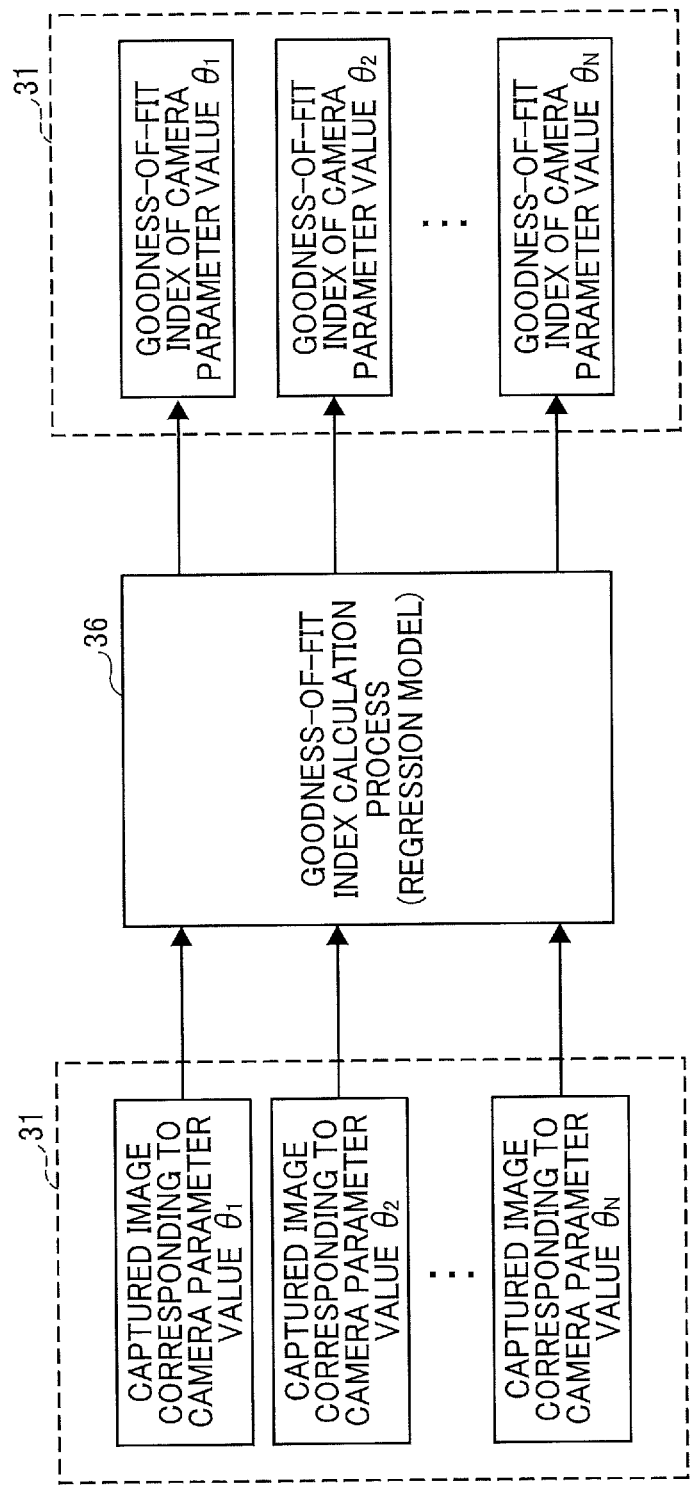
FIG. 9 is a diagram describing a flow of a process of simultaneously inputting a plurality of captured images to a regression model to output respective goodness-of-fit indices.

FIG. 9 is a diagram describing a flow of a process of simultaneously inputting a plurality of captured images to a regression model 36 to output respective goodness-of-fit indices. The regression model 36 illustrated in FIG. 9 is a regression model that receives a plurality of captured images as inputs, unlike the regression model that calculates a goodness-of-fit index separately for each of the captured images and that is adopted in the neural network 30 illustrated in FIG. 5. Since a plurality of captured images (captured images 31 corresponding to the respective camera parameter values $\theta_i$) are simultaneously input, the number of explanatory variables is increased in accordance with an increase in the number of captured images. In addition, the regression model 36 outputs the goodness-of-fit indices corresponding to the respective captured images (goodness-of-fit indices 32 of the respective camera parameter values $\theta_i$). Thus, the number of nodes in the output layer is equal to the number of camera parameter values $\theta_i$.

Figure 10:
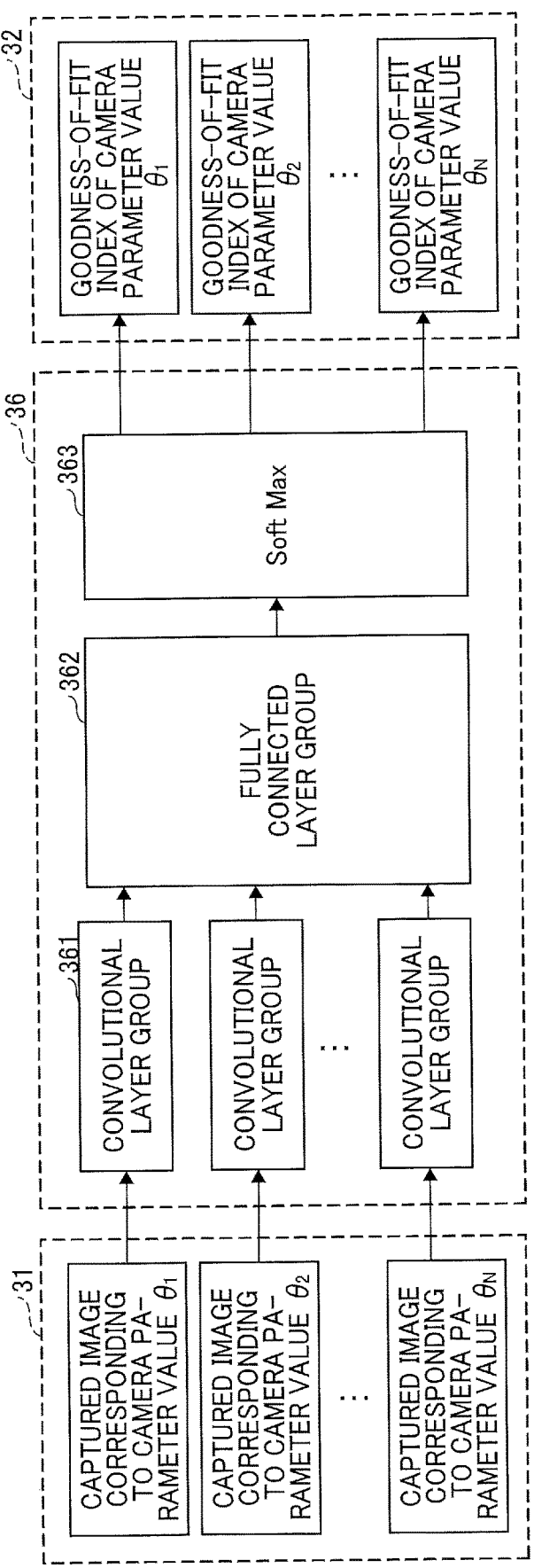
FIG. 10 is a diagram illustrating an example of a configuration of a regression model corresponding to the configuration illustrated in FIG. 9.

FIG. 10 illustrates an example of a configuration of the regression model 36 corresponding to the configuration illustrated FIG. 9. The regression model 36 illustrated in FIG. 10 includes as many convolutional layer groups 361 as the number of captured images, a fully connected layer group 362, and softmax 363. Note that the convolutional layer groups 361 and the fully connected layer group 362 include pooling layers and activation functions as well. In addition, the softmax 363 is a function that converts the goodness-of-fit indices 32 of the respective camera parameter values $\theta_i$ into probabilities. That is, the goodness-of-fit indices calculated by the regression model 36 illustrated in FIG. 10 are normalized such that the sum of the goodness-of-fit indices is equal to 1.

The configuration illustrated in FIG. 10 enables correlations between the captured images to be reflected. For example, the 3D model 35 to be processed represents an automobile having headlights of a characteristic design. In such a case, processing can be implemented which increases the goodness-of-fit indices of the viewpoints including the characteristic headlights in consideration of the entire viewpoint.

In addition, in an extreme example of the case where a plurality of captured images are input to the regression model, the virtual image capturing unit 102 may generate the captured images that are images having a resolution of 1×1 (one pixel) with a sufficiently narrow angle of view (about 0.1 degrees) in step S102, and the resulting pixels may be arranged to form input data in step S103. Captured images (pixels) having close camera parameter values are arranged closely to each other in the input image. This enables a structure relating to the closeness of the camera parameter values to be reflected in the input data.

Figure 11:
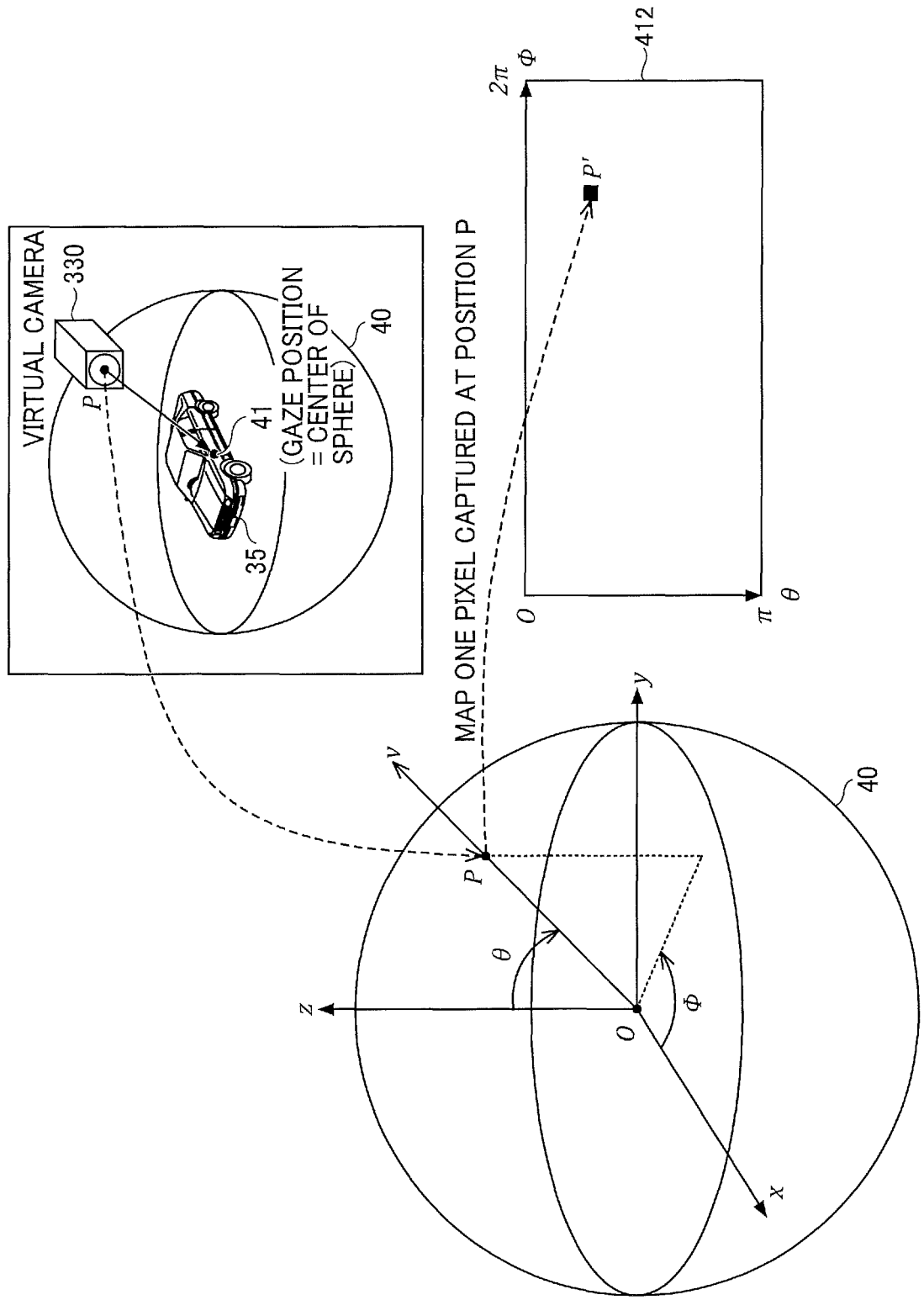
FIG. 11 is a diagram describing a process in which a plurality of captured images having a sufficiently narrow angle of view are input to the regression model.

FIG. 11 is a diagram describing a process in which a plurality of captured images having a sufficiently narrow angle of view are input to the regression model. As illustrated in FIG. 11, the virtual image capturing unit 102 fixes the gaze point of the virtual camera 330 to a single point (for example, a center 41 of a sphere which is a unit sphere) and restricts the position of the virtual camera 330 on a spherical surface 40 centered at the center 41 (the focal length is fixed).

At this time, the position of the virtual camera 330 is on the spherical surface 40. Therefore, when the image-capturing position (3D vector) is handled as the camera parameter, the camera parameter can be represented by polar coordinates $(\theta, \varphi)$ on the spherical surface 40 as illustrated in FIG. 11. Captured images of one pixel obtained by capturing the 3D model 35 from the position $(\theta, \varphi)$ on the spherical surface 40 with the center 41 of the sphere being set as the gaze point are arranged in a planar image of the equirectangular format. In this manner, a single equirectangular image (an equirectangular projection image 412) can be generated. Note that the value of the camera parameter $(\theta, \varphi)$ is sampled at an even interval. For example, when the value of the camera parameter $(\theta, \varphi)$ is sampled at an interval of 1 degree, the number of values of the camera parameter is equal to 180 $(=\pi) \times 360$ $(=2\pi)$.

Figure 12:
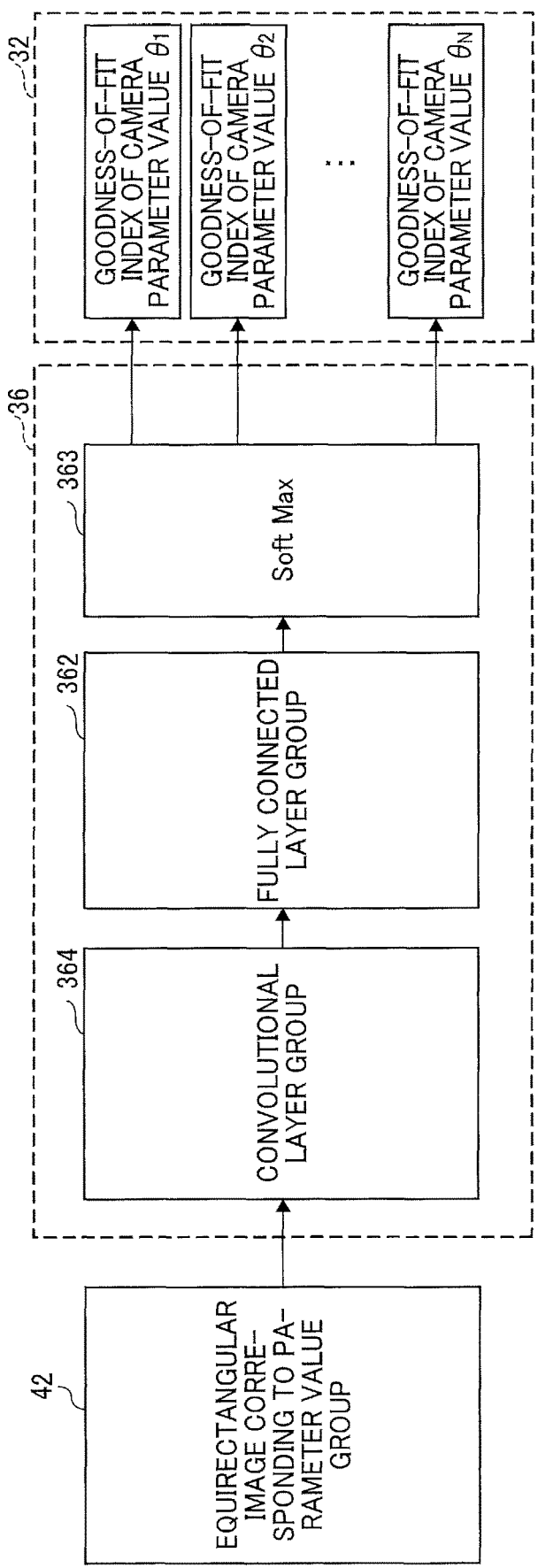
FIG. 12 is a diagram illustrating an example of a configuration of the regression model using a neural network to which an equirectangular projection image is input.

The regression model 36 receives this equirectangular projection image 42 as an input thereof, and calculates goodness-of-fit indices for the respective values of the camera parameter $(\theta, \varphi)$. FIG. 12 is a diagram illustrating an example of a configuration of the regression model 36 using a neural network to which the equirectangular projection image 42 is input. The configuration illustrated in FIG. 12 may be substantially the same as the configuration illustrated in FIG. 10 except that the configuration illustrated in FIG. 12 includes a single convolutional layer group 364.

In the case where a plurality of captured images are separately input to the regression model 36, separate convolutional layer groups 361 have to be provided for the respective captured images as illustrated in FIG. 10, for example. However, in FIG. 12, the convolutional layer group 364 is applicable to the entire equirectangular projection image 42. As a result, correlations between the individual pieces of input data can be reflected in the processing. That is, the goodness-of-fit indices of the respective viewpoints can be calculated in consideration of the entire viewpoint.

In addition, a fully connected layer group 362 illustrated in FIG. 12 may be omitted to reduce calculation cost. Note that the use of convolution on spherical surface data as the convolutional layer instead of ordinary convolution on planer surface data can reduce a decrease in accuracy due to the distortion on the spherical surface (see, for example, T. Cohen, et al., "Spherical CNNs," In proceedings of International Conference on Machine Learning, 2018).

Subsequently, a variation of step S104 will be described. The above-described method used in step S104 involves high calculation cost for finding a path having the largest goodness-of-fit index since a camera parameter search space is broad.

Accordingly, a method of clustering a distribution of the goodness-of-fit indices in the camera parameter space can be adopted instead. That is, the camera parameter space is divided into any number of clusters on the basis of the distribution of the goodness-of-fit indices, and camerawork is generated so that parameter average values (or mean values or mode values) of the respective clusters are traced.

Figure 13:
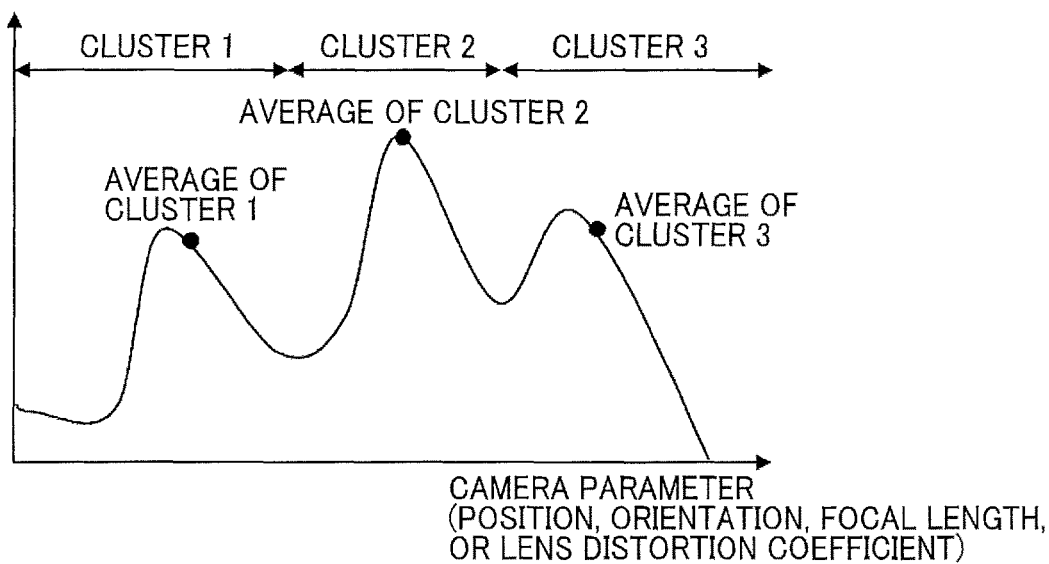
FIG. 13 is a diagram describing a camerawork generation method through clustering based on a distribution of goodness-of-fit indices.

FIG. 13 is a diagram describing a camerawork generation method through clustering based on a distribution of the goodness-of-fit indices. For convenience of explanation, FIG. 13 represents the camera parameter as a one-dimension parameter. However, in the case where the camera parameter is a multi-dimensional parameter, clustering is performed on the multi-dimensional space. In FIG. 13, the horizontal axis denotes the camera parameter, and the vertical axis denotes the goodness-of-fit index. Thus, FIG. 13 is a scatter diagram of the camera parameter and the corresponding goodness-of-fit index. The camera parameter values in ranges of close goodness-of-fit indices are clustered into three clusters 1 to 3 in FIG. 13. The camerawork generation unit 104 is capable of generating camerawork including camera parameter values corresponding to average values of the respective clusters 1 to 3.

Note that as the clustering technique, a common clustering technique such as k-means clustering or an expectation-maximization (EM) algorithm or variational Bayesian method on a Gaussian mixture model is usable.

Figure 14:
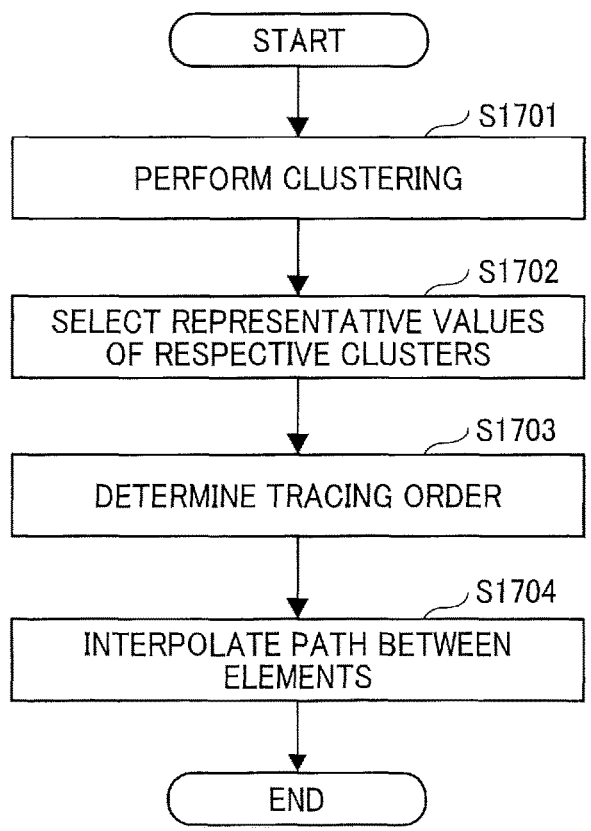
FIG. 14 is an example of a flowchart illustrating the camerawork generation method through clustering based on a distribution of goodness-of-fit indices.

FIG. 14 is an example of a flowchart illustrating the camerawork generation method through clustering based on the distribution of the goodness-of-fit indices. First, the camerawork generation unit 104 regards the goodness-of-fit indices for the respective camera parameter values as a frequency distribution and clusters the camera parameter space into a plurality of clusters (S1701). The number of clusters may be any value. It is assumed that the number of clusters is set in accordance with a reproduction time of a moving image, for example.

Then, the camerawork generation unit 104 selects representative parameter values (which typically are average values but may be mean values or mode values) of the respective clusters (S1702).

Then, the camerawork generation unit 104 determines the tracing order of the clusters in camerawork (S1703). In one method, an appropriate order (for example, the magnitude of the Euclidean distance from the origin) is introduced to the camera parameter space, and sorting is performed. In this manner, the tracing order is successfully determined. In another method, a distance (for example, the Euclidean distance) is introduced to the camera parameter space, and a representative parameter value of one cluster is randomly selected. Then, the representative parameter value of the cluster that is the closest to that value is then selected. This is recursively performed to successfully determine the order.

Lastly, the camerawork generation unit 104 interpolates the camerawork between the representative parameter values of the respective clusters that have been given the order (S1704). Any interpolation method such as linear interpolation or spline interpolation is usable to trace portions between the camera parameter values.

Figure 15:
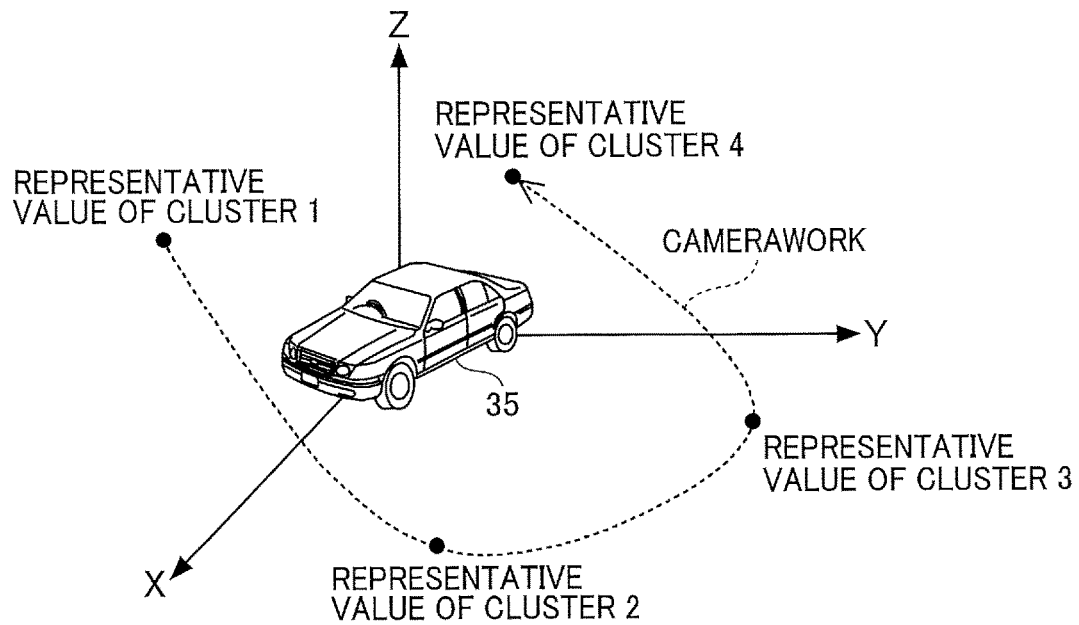
FIG. 15 is a diagram illustrating an example of interpolation of camerawork.

Through the process described above, camerawork that traces the camera parameter values corresponding to the representative parameter values of the plurality of clusters is successfully generated. FIG. 15 illustrates an example of interpolation of camerawork. FIG. 15 illustrates an example in which the camera position (coordinates of x, y, z) is used as the camera parameter and spline interpolation is performed on the representative parameter values of the four clusters to generate camerawork.

As described above, the distribution of the goodness-of-fit indices in the camera parameter space is clustered, the representative parameter values are selected from the respective clusters, and the selected camera parameter values are traced. In this manner, camerawork including the camera parameter values suitable for the content of the 3D model is successfully generated at low calculation cost.

In a second embodiment, a moving image generation apparatus 300 will be described which fixes a focal length for captured images of the 3D model 35 to narrow a camera parameter search space and generates camerawork at low calculation cost.

With the method according to the first embodiment, there is an inconvenience that the calculation cost increases depending on the number of elements of the camera parameters. In the present embodiment, the focal length among the camera parameters is fixed, and substantially the same method as that of the first embodiment is adopted to calculate the focal length in accordance with the value of a dispersion of the obtained goodness-of-fit indices. In this manner, a reduction in calculation cost is attempted.

Figure 16:
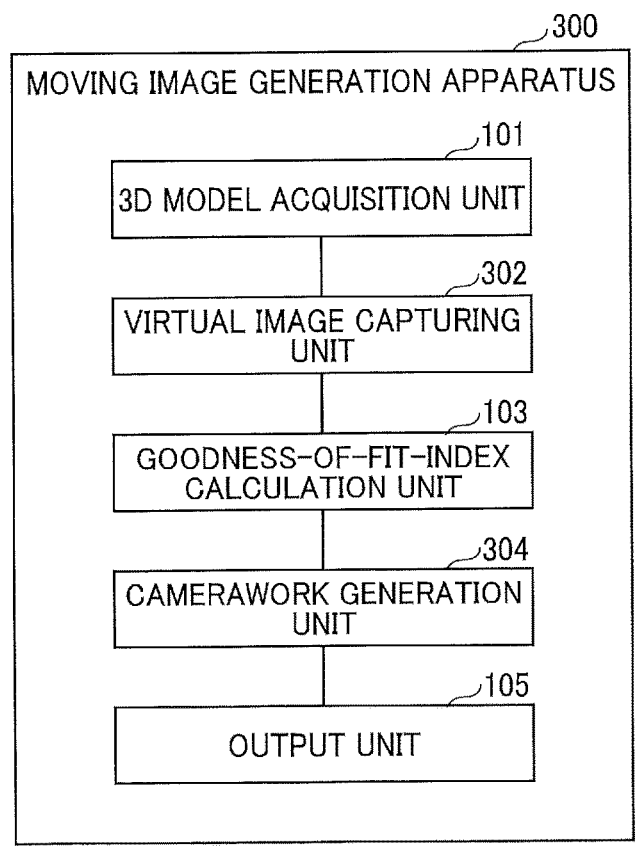
FIG. 16 is an example of a functional block diagram illustrating functions of a moving image generation apparatus as blocks.

FIG. 16 is an example of a functional block diagram illustrating functions of the moving image generation apparatus 300 according to the present embodiment as blocks. The moving image generation apparatus 300 according to the present embodiment includes a virtual image capturing unit 302 and a camerawork generation unit 304, as compared with the moving image generation apparatus 100 illustrated in FIG. 2. The functions of the virtual image capturing unit 302 and the camerawork generation unit 304 will be described with reference to FIG. 17.

Figure 17:
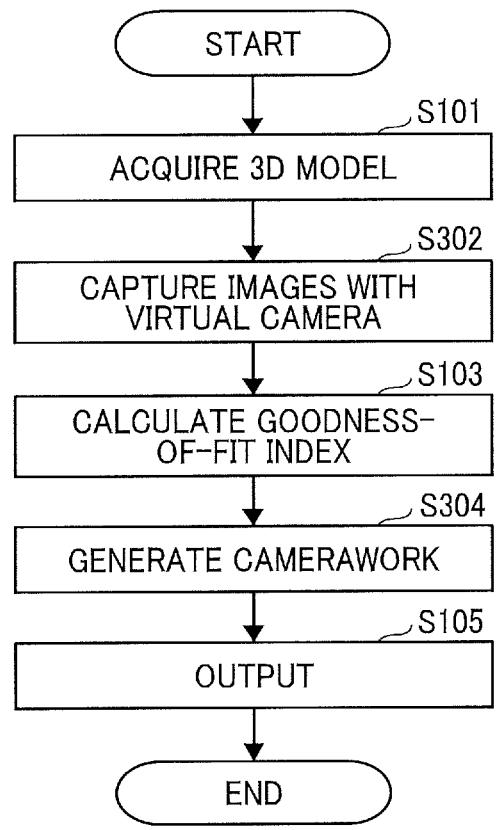
FIG. 17 is an example of a flowchart illustrating a procedure in which the moving image generation apparatus generates camerawork.

FIG. 17 is an example of a flowchart illustrating a procedure in which the moving image generation apparatus 300 generates camerawork. FIG. 17 is different from FIG. 3 in steps S302 and S304. The differences from FIG. 3 will be mainly described below.

In step S302, the virtual image capturing unit 302 generates captured images of the 3D model 35 that are obtained with a virtual camera. Camera parameters of the virtual camera include a position, an orientation, an aspect ratio, and a lens distortion. The virtual image capturing unit 302 changes the values of the camera parameters to generate a plurality of captured images. In the present embodiment, the focal length is fixed.

In step S304, the camerawork generation unit 304 generates camerawork (time-series camera parameter values) on the basis of goodness-of-fit indices calculated by the camerawork generation unit 304 for the respective camera parameters. The focal length is fixed, but the values of the rest of the camera parameters are selectable in substantially the same manner as that of the first embodiment.

The dispersion of the goodness-of-fit indices for the camera position in the path based on the values of the camera parameters other than the focal length is reflected to the focal length. That is, the dispersion of the camera position when the goodness-of-fit indices are regarded as probability densities of the camera position is reflected to the focal length.

Figure 18:
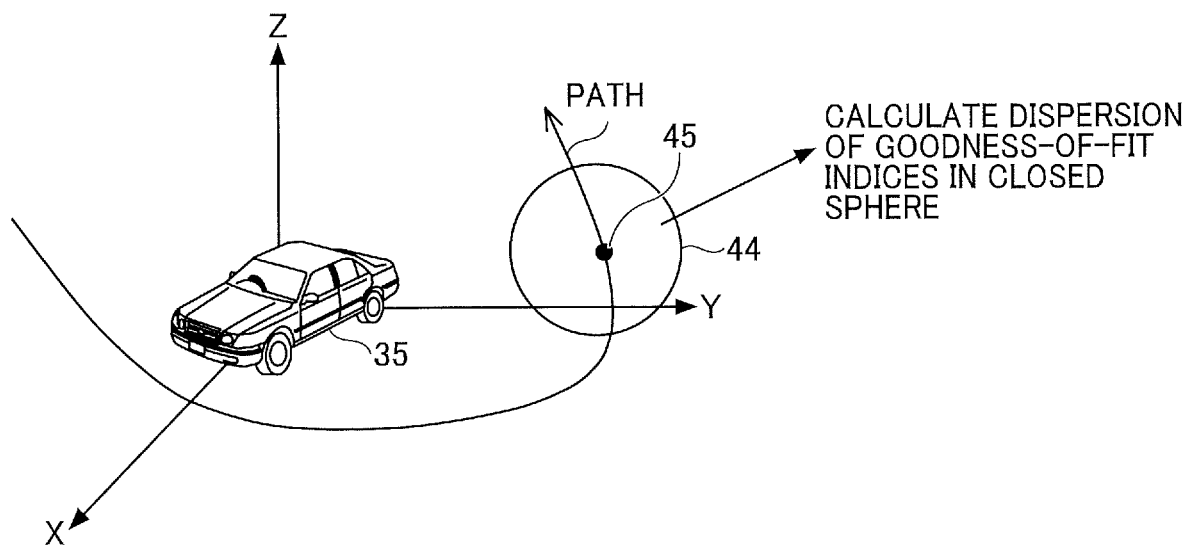
FIG. 18 is a diagram describing a dispersion of the goodness-of-fit indices for a camera position.

FIG. 18 is a diagram describing the dispersion of the goodness-of-fit indices for the camera position. As illustrated in FIG. 18, a closed sphere 44 having an appropriate radius and centered at a point on the resulting path is considered. The camerawork generation unit 304 reflects the dispersion in the distribution of the goodness-of-fit indices in the closed sphere 44 to the focal length. A covariance matrix is calculated as the dispersion of the distribution, and the resulting matrix or the trace is usable. A covariance matrix C for the distribution of goodness-of-fit indices in the closed sphere 44 can be calculated using Equation (1) below for the camera position x=(x, y, z)^T, the closed sphere B(x) at the position x, and the goodness-of-fit indices f(x).

$$C = \frac{1}{Z} \int_{B(x)} f(x)(x-\mu)(x-\mu)^T dx \quad (1)$$

$$\mu = \frac{1}{Z} \int_{B(x)} f(x)x\,dx$$

$$Z = \int_{B(x)} f(x)dx$$

Here, integration can be performed as calculation of numerical values by representing the position x as discrete values. The camerawork generation unit 304 decreases the focal length (increases the angle of view) when the dispersion is large and increases the focal length (decreases the angle of view) when the dispersion is small. A function or table for converting the dispersion into the focal length is prepared in advance.

This consequently implements control for increasing the angle of view when the goodness-of-fit index is high near a certain camera position and for decreasing the angle of view when the goodness-of-fit index is locally low at a certain camera position. In addition, when the path is generated based on clustering, the focal length is successfully determined in accordance with the dispersions of the goodness-of-fit indices in the respective clusters by using substantially the same technique as the technique described above.

In the present embodiment, captured images are generated with the focal length being fixed, and the focal length is determined on the basis of the dispersion of the goodness-of-fit indices for the group of captured images. In this manner, camerawork is successfully generated at low calculation cost.

While the embodiments of the present disclosure have been described above, the present disclosure is not limited to such embodiments. Thus, various modifications and replacements may be made within the scope not departing from the gist of the present disclosure.

For example, the present embodiments are applicable, as well as to generation of a 3D CG moving image, to a virtual reality system and further to advertisements using these. In addition, the present embodiments allow a viewer to effectively browse merchandise and services represented by the 3D model 35 at various electronic commerce (EC) sites.

In addition, in the present embodiments, the moving image generation apparatus 100 or 300 learns associations between a captured image and a corresponding goodness-of-fit index by machine learning. Machine learning is a technique allowing a computer to obtain a learning ability such as that of a person and is a technique for autonomously generating an algorithm used for determination such as data classification from training data that is obtained in advance and for applying the algorithm to new data to perform prediction. The machine learning method may be any of supervised learning, unsupervised learning, semi-supervised learning, reinforcement learning, and deep learning, or any combination of these. That is, any machine learning method may be used.

The configuration examples illustrated in FIG. 3 and the other drawings presented in the embodiments described above are examples in which each process performed by the moving image generation apparatus 100 or 300 is divided in accordance with main functions for ease of understanding. However, the present disclosure is not limited by the way in which each process is divided into processing units or the names of the processing units. The moving image generation apparatus 100 or 300 may be divided into a greater number of processing units depending on the content of the process. In addition, the division may be performed so that one processing unit contains more processing.

Each of the functions of the above-described embodiments may be implemented by one or more pieces of processing circuitry. Here, the term "processing circuitry" used herein refers to a processor that is programmed to carry out each function by software such as a processor implemented by an electronic circuit, or a device such as an application specific integrated circuit (ASIC), digital signal processor (DSP), field programmable gate array (FPGA) that is desired to carry out each function described above, or a conventional circuit module.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A moving image generation apparatus comprising:
circuitry configured to:
  capture images of a three-dimensional model using different values of a camera parameter of a virtual camera to generate captured images;
  calculate goodness-of-fit indices using the captured images as inputs, the goodness-of-fit indices being calculated by a regression model that is trained with training data including sets of captured images and values, each of the values indicating levels of an aesthetic property and a recognizability of the three-dimensional model; and
  generate camerawork that traces values of the camera parameter of the virtual camera, based on the calculated goodness-of-fit indices,
wherein the circuitry is configured to randomly generate a plurality of pieces of the camerawork in a camera parameter space, and to generate the camerawork having a largest sum among sums of the goodness-of-fit indices of the respective values of the camera parameter that are included in the respective pieces of the camerawork.

2. The moving image generation apparatus according to claim 1, wherein
the camera parameter includes a plurality of elements, and the circuitry is configured to:
  capture images of the three-dimensional model with a focal length of the virtual camera being fixed among the plurality of elements and with values of a rest of the plurality of elements being changed; and reflect, to the focal length, a dispersion of the goodness-of-fit indices in a closed sphere centered at a point in the camera parameter space to generate the camerawork.

3. The moving image generation apparatus according to claim 1, wherein the circuitry is configured to cluster a distribution of the goodness-of-fit indices in a camera parameter space of the virtual camera to create clusters, select representative parameter values of the respective clusters, and generate the camerawork that traces the representative parameter values.

4. The moving image generation apparatus according to claim 1, wherein the circuitry is configured to input the captured images to a regression model to calculate the goodness-of-fit indices, the regression model having been trained with an association between a captured image of the three-dimensional model and a corresponding goodness-of-fit index.

5. The moving image generation apparatus according to claim 4, wherein the circuitry is configured to collectively input at a time the captured images to a regression model to calculate the respective goodness-of-fit indices, the regression model having been trained with associations between a plurality of captured images of the three-dimensional model and respective goodness-of-fit indices.

6. The moving image generation apparatus according to claim 5, wherein the circuitry is configured to:
fix a gaze point of the virtual camera and constrain a position of the virtual camera onto a spherical surface centered at the gaze point;
arrange captured images of one pixel, the captured images being obtained by capturing images of the three-dimensional model at the gaze point while changing the position of the virtual camera on the spherical surface, on a planer image in an equirectangular format to generate a single equirectangular projection image; and
input the equirectangular projection image to the regression model to calculate the goodness-of-fit indices.

7. The moving image generation apparatus according to claim 1, wherein the camera parameter includes a camera projection center, a gaze position, an optical-axis rotation, and a focal length.

8. The moving image generation apparatus according to claim 1, wherein the regression model employs neural network.

9. A method for generating a moving image, comprising:
capturing images of a three-dimensional model using different values of a camera parameter of a virtual camera to generate captured images;
calculating goodness-of-fit indices using the captured images as inputs, the goodness-of-fit indices being calculated by a regression model that is trained with training data including sets of captured images and values, each of the values indicating levels of an aesthetic property and a recognizability of the three-dimensional model;
generating camerawork that traces values of the camera parameter of the virtual camera, based on the calculated goodness-of-fit indices, and
randomly generating a plurality of pieces of the camerawork in a camera parameter space, and generating the camerawork having a largest sum among sums of the goodness-of-fit indices of the respective values of the camera parameter that are included in the respective pieces of the camerawork.

10. A non-transitory recording medium which, when executed by one or more processors, cause the processors to perform a method for generating a moving image comprising:
capturing images of a three-dimensional model using different values of a camera parameter of a virtual camera to generate captured images;
calculating goodness-of-fit indices using the captured images as inputs, the goodness-of-fit indices being calculated by a regression model that is trained with training data including sets of captured images and values, each of the values indicating levels of an aesthetic property and a recognizability of the three-dimensional model;
generating camerawork that traces values of the camera parameter of the virtual camera, based on the calculated goodness-of-fit indices, and
randomly generating a plurality of pieces of the camerawork in a camera parameter space, and generating the camerawork having a largest sum among sums of the goodness-of-fit indices of the respective values of the camera parameter that are included in the respective pieces of the camerawork.

* * * * *